Patented Feb. 16, 1926.

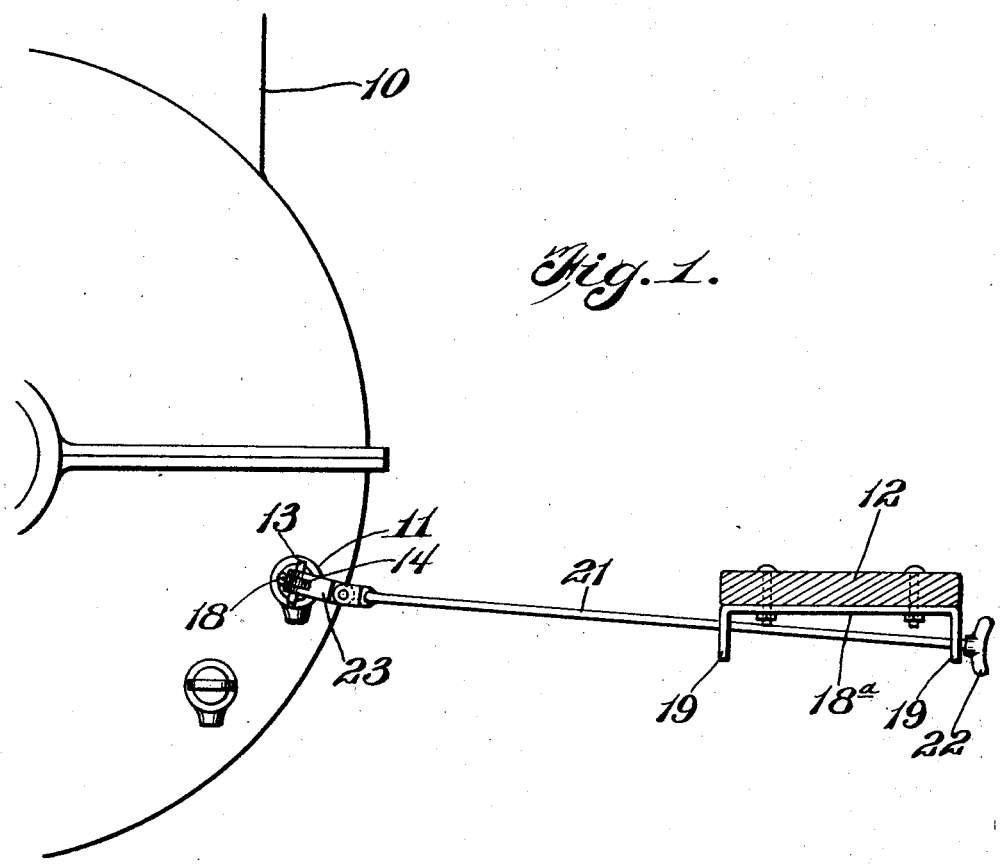
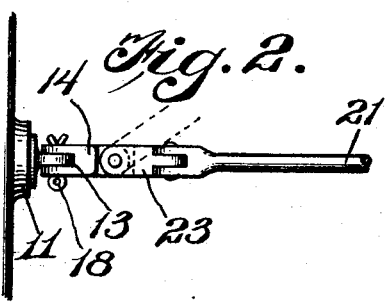
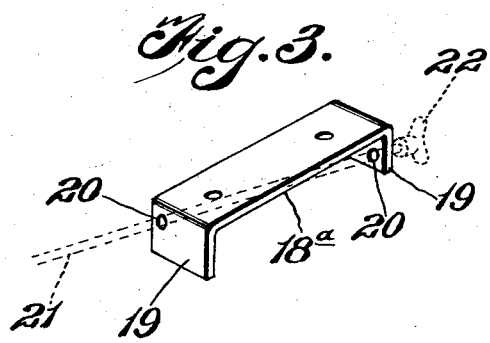
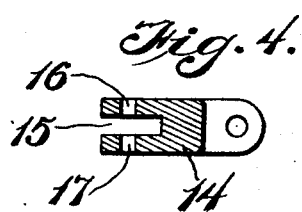

1,573,661

UNITED STATES PATENT OFFICE.

BURNISE A. WALBRIDGE AND CHARLES E. WALBRIDGE, OF IHLEN, MINNESOTA.

PET-COCK-OPERATING DEVICE FOR AUTOMOBILES.

Application filed December 15, 1925. Serial No. 75,554.

*To all whom it may concern:*

Be it known that we, BURNISE A. WALBRIDGE and CHARLES E. WALBRIDGE, citizens of the United States, residing at Ihlen, in the county of Pipestone and State of Minnesota, have invented certain new and useful Improvements in Pet-Cock-Operating Devices for Automobiles, of which the following is a specification, reference being had to the accompanying drawings.

This invention relates to pet cock operating devices for automobiles and more particularly to a device for operating an oil control pet cock of a certain type of automobile engine.

An important object of the invention is to provide a control for these pet cocks whereby they may be operated from the side of the machine instead of from beneath the machine, as is necessary with the ordinary construction.

A further object of the invention is to produce a device of this character which may be very cheaply manufactured and which will be durable and efficient in service.

These and other objects we attain by the construction shown in the accompanying drawing, wherein for the purpose of illustration is shown a preferred embodiment of our invention and wherein:—

Figure 1 is a detail view partially in section showing a pet cock operating element constructed in accordance with our invention applied to the oil control pet cock of a vehicle;

Figure 2 is a detail view showing the manner of attaching the operating element to the pet cock and the construction of the universal joint;

Figure 3 is a perspective view of the bracket employed for mounting the operating element upon the under surface of the running board;

Figure 4 is a detail sectional view taken through the element of the operating member which actually engages with the pet cock.

Referring now more particularly to the drawing, the numeral 10 indicates an automobile engine having an oil control pet cock 11 directed longitudinally of the vehicle and 12 designates the running board of the vehicle. The pet cock 11 has the usual flattened rotatable operating element 13 by means of which it is controlled.

In accordance with our invention, we provide a member 14 having a slot 15 for the reception of the flattened element. The arms produced by this slot and the flattened element are provided with coacting openings 16 and 17 for the reception of a cotter pin 18 whereby the member 14 is secured to the pet cock operating element.

Beneath the running board is secured an inverted U-shaped casting 18$^a$, the depending arms 19 of which have formed therein openings 20 through which is directed a rod 21. The outer end of this rod has an operating knob 22 while the inner end thereof is connected to the member 14 by a universal joint 23. Any suitable means may be provided for securing the casting 18 to the running board 12, bolts being employed for this purpose in the present illustration.

Since the construction hereinbefore set forth is obviously capable of a certain range of change and modification without materially departing from the spirit of the invention, we do not limit ourselves to such specific structure except as hereinafter claimed.

We claim:—

1. In combination with a vehicle including an engine having an oil control pet cock provided longitudinally of the vehicle and a running board likewise extending longitudinally of the vehicle, a member having depending arms spaced transversely of the vehicle and secured to the under surface of the running board, said arms having openings formed therein, a rod directed through said openings, a member secured to the operating element of the pet cock and a universal connection between the inner end of the rod and the member.

2. In combination with a vehicle including an engine having an oil control pet cock provided longitudinally of the vehicle and a running board likewise extending longitudinally of the vehicle, a member having depending arms spaced transversely of the vehicle and secured to the under surface of the running board, said arms having openings formed therein, a rod directed through said openings, a member secured to the operating element of the pet cock, a universal connection between the inner end of the rod and the member, the operating element of the pet cock being flattened, said member having a slot producing arms receiving therebetween the flattened operating member, the operating member and arms having coacting openings and a securing element directed through said openings.

In testimony whereof we hereunto affix our signatures.

BURNISE A. WALBRIDGE.
CHARLES E. WALBRIDGE.